US008713179B2

(12) United States Patent
Dawson et al.

(10) Patent No.: US 8,713,179 B2
(45) Date of Patent: Apr. 29, 2014

(54) GRID COMPUTING ACCOUNTING AND STATISTICS MANAGEMENT SYSTEM

(75) Inventors: Christopher J. Dawson, Arlington, VA (US); Rick A. Hamilton, II, Charlottesville, VA (US); Joshy Joseph, Redmond, WA (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1841 days.

(21) Appl. No.: 11/243,658

(22) Filed: Oct. 4, 2005

(65) Prior Publication Data

US 2007/0078960 A1 Apr. 5, 2007

(51) Int. Cl.
*G06F 15/173* (2006.01)
(52) U.S. Cl.
USPC .......................................... 709/226; 718/104
(58) Field of Classification Search
USPC ........... 709/205, 223–229; 718/102, 104, 105
See application file for complete search history.

(56) References Cited

U.S. PATENT DOCUMENTS

| | | | | |
|---|---|---|---|---|
| 6,076,174 | A * | 6/2000 | Freund | 714/47 |
| 7,433,931 | B2 * | 10/2008 | Richoux | 709/217 |
| 7,519,564 | B2 * | 4/2009 | Horvitz | 706/12 |
| 2003/0163469 | A1 * | 8/2003 | Garth et al. | 707/9 |
| 2004/0044718 | A1 | 3/2004 | Ferstl et al. | |
| 2004/0056908 | A1 * | 3/2004 | Bjornson et al. | 345/968 |
| 2004/0123296 | A1 | 6/2004 | Challenger et al. | |
| 2004/0167980 | A1 | 8/2004 | Doyle et al. | |
| 2004/0193461 | A1 | 9/2004 | Keohane et al. | |

OTHER PUBLICATIONS

Appleby, et al, "Oceano—SLA Based Management of a Computing Utility", 2001 IEEE, pp. 855-868.*
Zanikolas, et al, "A taxonomy of grid monitoring systems", 2004 Elsevier, pp. 163-188.*
Baker, et al, "GridMonitor: Integration of Large Scale Facility Fabric Monitoring with Meta Data Service in Grid Environment", 2003, ArXiv, pp. 1-8.*
Balaton, et al, "Resource and Job Monitoring in the Grid", 2003, Springer, pp. 404-411.*
Buyya, et al, "Nimrod/G: An Architecture for a Resource Management and Scheduling System in a Global Computational Grid", 2000 IEEE, pp. 283-289.*
In, et al, "Policy Based Scheduling for Simple Quality of Service in Grid Computing", 2004, IEEE Parallel and Distributed Symposium.*

(Continued)

*Primary Examiner* — Patrice Winder
*Assistant Examiner* — Julian Chang
(74) *Attorney, Agent, or Firm* — Whitham, Curtis, Christopherson & Cook, P.C.; Lisa J. Ulrich (57) ABSTRACT

Performance data is captured periodically from resources and groups of resources in a grid computing environment and stored in a content-addressable data repository from which it can be accessed in response to an arbitrarily complex query in regard to specifics of particular jobs or job portions, particular resources utilized, grid architecture, application environment, concurrent jobs or job portions and the like. The data repository may be distributed or divided in regard to grid environment architecture, security domains or the like and each portion or division may be implemented in a modular fashion including an accounting and statistics management module and additional modules or computing engines for performing particular desired analyses or functions. Results of such analyses or functions may be communicated to a grid workload agent (and associated modules) to improve grid management on a fine-grained basis.

16 Claims, 4 Drawing Sheets

(56) References Cited

OTHER PUBLICATIONS

Lee, et al, "Run-Time Prediction of Parallel Applications on Shared Environments", IEEE Proceedings of the IEEE Int'l Conf. on Cluster Computing (CLUSTER'03), 2003.*

Yue, "Global Backfilling Scheduling in Multiclusters", 2004, Springer, Applied Computing, vol. 3285, pp. 232-239.*

Krsul, et al. "VMPlants: Providing and Managing Virtual Machine Execution Environments for Grid Computing", 2004 IEEE.*

Blythe, et al. "The Role of Planning in Grid Computing", 2002, AAAI.*

J. Joseph and C. Fellenstein.; "Grid Computing"; Prentice Hall Professional Technical Reference, 2004; Entire Book.

R. Zhang et al; "OGSA-based Grid Workload Monitoring"; Procedures of the International Symposium on Cluster Computing and the Grid, May 9, 2005, pp. 668-675.

* cited by examiner

Query accounting and statistic subsystem for aggregate DB2 row scan time

Low query depth

| DB2 row count = 1000 | Time = 10s |
|---|---|
| DB2 row count = 3000 | Time = 35s |

| Low query depth | Result |
|---|---|
| 4000 rows / 45s | Time = 1.125s |

High query depth

| DB2 row count = 1000 | Time = 10s |
|---|---|
| DB2 row count = 3000 | Time = 35s |
| DB2 row count = 5000 | Time = 40s |
| DB2 row count = 2000 | Time = 20s |
| DB2 row count = 8000 | Time = 70s |
| DB2 row count = 1000 | Time = 10s |
| DB2 row count = 4000 | Time = 35s |
| DB2 row count = 2000 | Time = 15s |

| High query depth | Result |
|---|---|
| 26000 rows / 235s | Time = 0.900s |

*Figure 3*

GRID COMPUTING ACCOUNTING AND STATISTICS MANAGEMENT SYSTEM

BACKGROUND OF THE INVENTION

1. Field of the Invention

The present invention generally relates to grid computing environments and, more particularly, to performance-based management of grid resource usage for efficient use and efficient prediction of performance of resources available in the grid computing environment.

2. Description of the Prior Art

It is well-known to provide communication links between data processors for communication or for the sharing of resources which may be available on one data processor but not another. In the latter case, the data processor having the resource is commonly referred to as a server and the data processor requesting the resource is commonly referred to as the client. Connections may be provided between many such data processors in a network-like arrangement such as a local area network (LAN), wide area network (WAN), virtual networks within other networks, the Internet, and the like.

As sharing of resources has become more widespread and sophisticated, it has become common to perform some data processing (which may involve the requested resource to some degree) at a location remote from a given data processor. Some efficiency and improvement in response time and processor usage may be achieved in this manner although potential gains have been difficult to predict or quantitatively estimate. It has also proven to be generally more advantageous in many cases to obtain increased computing power by distributing data processing over multiple connected data processors than to incur the expense of obtaining increased computing power in a single data processor such as has resulted in so-called supercomputers. Further, in an environment where remote data processing is continually becoming more common, the size, speed and computing power of server systems is continually being increased and multiple methods of grouping servers have been developed such as clustering, multi-server shared data (sysplex) and grid environments and enterprise systems. In a cluster of servers or other arrangements, one server is typically designated to manage increasing numbers of incoming requests while other servers operate in parallel to handle distributed portions of respective requests from clients. Typically, servers and groups of servers operate on a particular platform such as Unix™ or some variation thereof to provide a distributed hosting environment for running applications. Each network platform may offer a variety of functions as well as different implementations, semantic behaviors and application programming interfaces (APIs).

However, mere interconnection of data processors does not assure increased efficiency or speed of response and is limited in its capability for doing so under the best of circumstances. Some additional efficiency and speed of response gains have been achieved by organizing servers and groups of servers as a distributed resource in which collaboration, data sharing, cycle sharing and other modes of interaction between servers may be increased to the extent possible given that different resources may not be subject to the same management system although they may have similar facilities for handling security, membership and the like. For example, resources available on a desktop personal computer are not typically subject to the same management system as a managed server cluster of a company with which the personal computer may be networked. Similarly, different administrative groups within a company may have groups of servers which may implement different management systems.

The problems engendered by separate management systems which may have different security policies and which operate on different platforms has led to the development of so-called grid technologies using open standards for operating a grid environment to support maximized sharing and coordinated use of heterogenous and distributed resources. A virtual organization is created within a grid environment when a selection of resources from different and possibly distributed systems operated by different organizations with different security and access policies and management systems is organized to handle a job request.

However, grid technologies do not solve all communication problems between groups of resources having different management systems and different standards. For example, the tools and systems which are currently arranged to monitor performance of each group of systems are limited in that they group resources in accordance with hardware type of particular resources and monitor performance at a hardware level. Also, as a result of grouping resources in this way, such monitoring tools and systems are limited to using protocols implemented on the hardware resources and thus typically do not support communication directly between the monitoring tools and systems of different groups and/or different management systems. Therefore it is difficult to even monitor grid activity at any given time (although a solution is provided in U.S. patent application Ser. No. 11/031,490 which is assigned to the assignee of the present invention and hereby fully incorporated by reference, which uses a grid workload agent to query grid modules in accordance with specified or adaptively generated monitoring rules to maintain and populate a grid activity database from which data is supplied to various modules to perform grid control functions), much less allocating portions of a data processing job and supporting other necessary activities of a commercial grid computing operation such as pricing, refinement of hardware and software requirement decisions, enhancing accuracy and performance of request for proposal (RFP) processing (e.g. improvement of run time estimation leading to, for example, improvement in adherence to and satisfaction of service level agreements), increasing of intra-grid processing efficiency by improving efficiency of resource allocation based on prior performance statistics and current performance estimates or supporting financial analysis of grid elements or computing industry trends. Robust industry tools for these purposes do not presently exist which are capable of addressing the requirements of an on-demand grid computing environment.

Rather, at the present state of the art, grid computing is being managed using much the same methods practiced in single organization computing environments. That is, management and information technology (IT) staff generally discuss potential inbound jobs and, based on their best estimation from their accumulated expertise (which may be quite variable and often without empirical data), develop computing resource requirements and associated costs (generally a fixed hourly cost because mechanisms do not exist to support a more granular or specific pricing model with a more certain degree of accuracy). While performance data may be collected on the grid, absent job data from a plurality of related jobs or jobs having similar characteristics which can be correlated with other jobs for evaluation, such performance data is not particularly helpful in generating accurate job run times and pricing estimates.

For example, in a traditional computing environment, a single application, such as DB2™, may be running on a specific node or set of nodes. A performance monitor may periodically sample data from such a node and determine facts such as peak workload trends. In a grid environment, however, a node may run several different applications, each processing one or more portions of one or more jobs, during any given period of time and, in the absence of much more comprehensive data regarding the grid as a whole, simple raw performance data in regard to hardware for any given node is meaningless in regard to particular jobs having particular characteristics and, even if collectable, data for a plurality of nodes cannot be correlated with incoming jobs being evaluated since performance of each node for any given period of time may relate to a plurality of jobs having diverse requirements and characteristics being performed on the hardware of each node.

The problem is also complicated by the dynamics of on-demand computing. Traditional and currently existing performance data collection tools often allow for little more than trend development such that workload can be smoothed based on trend analysis. For example, in a case where DB2 database (server) nodes of a client are being consistently overworked during one periodically repeating time period and consistently underworked during another, some batch processing jobs can be moved from the former time period to the latter. It can be seen that this style of monitoring and smoothing is directed to smoothing application performance on the assigned static resources on which they execute. With on-demand computing, however, this style of monitoring and smoothing is not sufficient since the dynamic nature of on-demand computing recognizes that a large variety of jobs and applications could be running on any given grid node at any given time. That is, a grid node which was participating in an AIX™ based DB2 database job session at one particular time, in an on-demand grid environment, could be executing compiler jobs of LINUX™ immediately thereafter. Given the likelihood of such radical changes in resource usage occurring within a grid environment, traditional tools and smoothing analysis styles are insufficient and cannot collect, much less correlate and analyze, performance data for jobs having potentially related job characteristics.

The problem is additionally complicated in that the grid may include a plurality of resources capable of performing a given portion of a given job but which may not be available at a given time and which, when available, may exhibit different performance for a given portion of a given job. For example, a given portion of a given job may be run on AIX™ or LINUX™ running DB2 but current performance monitoring tools cannot reveal that the portion of the job has historically executed faster and at lower cost in a LINUX™ node group than an AIX™ node group (or vice-versa) and thus cannot skew the resource selection for a similar job towards LINUX™ (or AIX™) resources within the grid other than through the expertise or intuition of the management and IT staff alluded to above which provides no mechanism for accurately determining pricing and the like, given that the more efficient LINUX™ (or AIX™) resources may not be available at a given execution time for the requested job or response to an RFP.

In summary, when two or more different resources may be available for a particular portion of a given job it would, of course, be advantageous to be able to allocate a portion of a job to the resource which can perform it most efficiently and estimate the time which would be taken by that resource to process the job or job portion. However, at the present state of the art, there is no tool available to project the probability of the availability of the most efficient resource or to provide information regarding comparative probable efficiency of any resources which may actually be available at run time in regard to job portions having particular characteristics. That is, at the present state of the art, performance data, even if collectable, is referenced to particular hardware resources which may reflect collective performance over a plurality of job portions which may have different characteristics and which thus masks performance data for individual job portions.

SUMMARY OF THE INVENTION

It is therefore an object of the present invention to provide a comprehensive system and method for monitoring, evaluating, archiving and publishing to related grid modules comprehensive historical statistics which allow for increasingly accurate and efficient management of a computing grid as a whole and the resources available therefrom.

It is another object of the invention to provide a tool for collecting and correlating job performance data from nodes across a grid computing environment to support smoothing and, prospectively, accurate estimation, assessment and analysis of resource usage which allows selection of the most efficient grid resources for each individually submitted application or job based on historical data for different jobs that may have some similar characteristics or requirements.

It is a further object of the invention to provide for data collection, storage and retrieval to support refinement of inbound job cost development or estimation, refinement of hardware and software platform requirement decisions for inbound grid jobs, enhance performance and accuracy of grid RFP generation, improve intra-grid efficiency through statistical learning, provide a platform for financial analysis of grid elements, and provide a platform for computing industry trend analysis.

It is yet another object of the invention to provide for and support a grid module for performing the above functions.

In order to accomplish these and other objects of the invention, a method of managing a grid computing environment is provided including steps of performing portions of a data processing request using respective resources of the grid computing environment, periodically storing data records corresponding to performance of respective resources and characteristics of the job portions from respective resources performing portions of the data processing request, retrieving selected data records in accordance with data stored therein, and processing retrieved data to produce processed performance data as historical performance statistics.

In accordance with another aspect of the invention, a system for managing a grid computing environment is provided comprising an arrangement for monitoring respective resources of the grid computing environment processing portions of data processing requests, content-addressable storage for periodically storing performance data from respective monitored resources including data identifying a corresponding monitored respective resource and a characteristic of the job portion, an arrangement for retrieving, on the basis of such characteristic, and processing data to form processed performance data, and an arrangement, preferably implemented as modules, for managing the grid computing environment based on the processed performance data.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
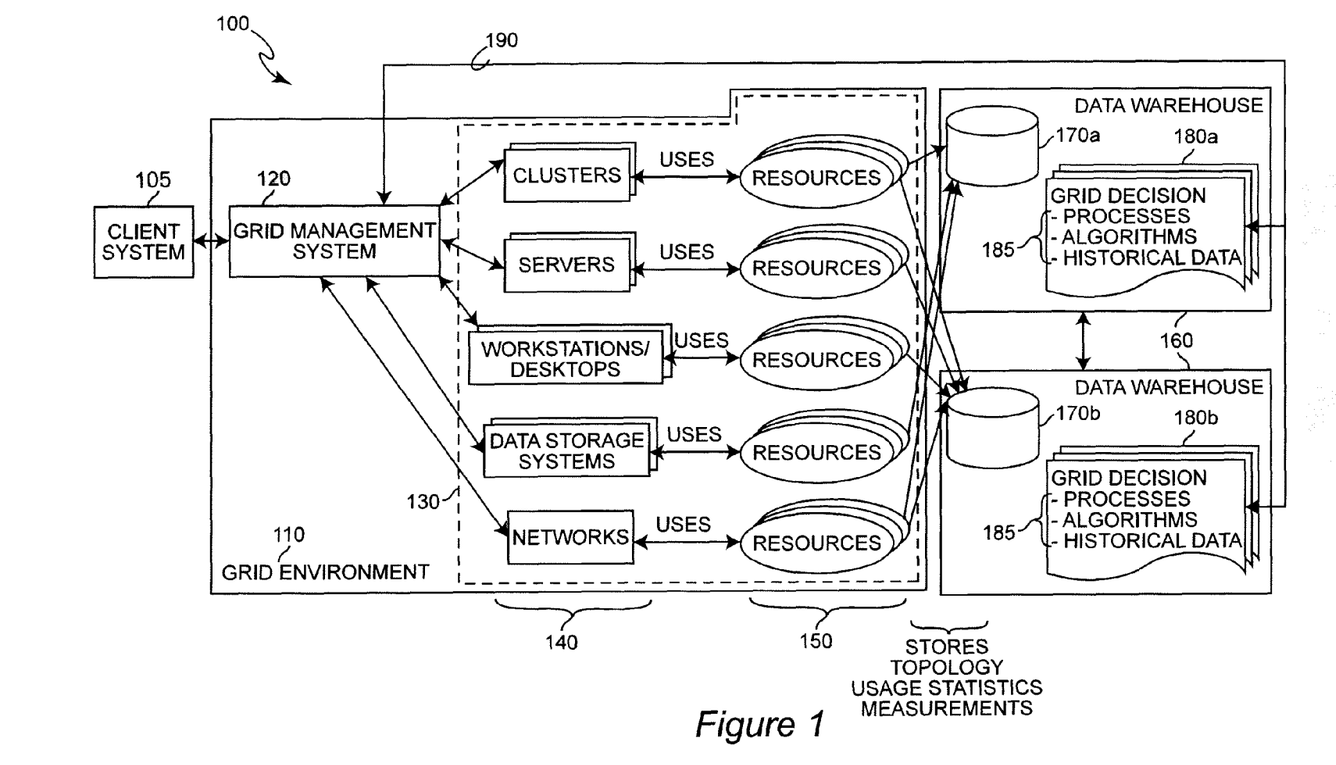
FIG. 1 is a block diagram overview of grid system architecture for performance reporting in accordance with the present invention.

Referring now to the drawings, and more particularly to FIG. 1, there is shown a block diagram of the overall system architecture of the grid environment and accounting and statistics management system 100 in accordance with the invention. Those skilled in the art will recognize a substantial similarity of portions of FIGS. 1, 1A and 1B to FIGS. 2 and 5, respectively, of the above incorporated U.S. Patent Application and a comparison of these Figures will be of assistance in conveying an appreciation of the additional facilities and functions and improvements in the functions of the invention of the above-incorporated application which are provided by the present invention. More specifically, as detailed in the above-incorporated U.S. Patent Application, a grid environment 110 includes a grid management system 120 and a virtual resource 130. However, the grid management system 120 of the present invention provides substantial additional functionality by virtue of inclusion of an accounting and statistics management system as will be discussed in greater detail below. That is, it is preferable that any grid environment including the present invention also be capable of providing at least some of the functions of the above-incorporated U.S. Patent Application; which functions can be substantially improved by inclusion of the invention.

The grid environment is accessible by client System 105 over a network or other arrangement, the Details of which are not important to the practice of the present invention. The communication from client system 105 is depicted as being to the grid management system 120 which will manage the allocation of processors and applications 140 which will, in turn, utilize various accessible resources 150, and manage responses to queries and other functions responsive to client system requests.

In addition to the grid environment 110 detailed in the above-incorporated U.S. Patent Application, the invention provides for performance reporting from the various resources 150 to data warehouse(s) 160 which can be a single performance data repository or can be divided and/or distributed as may best accommodate a particular application of the invention to a given grid environment. This can be implemented with any known network communication technology such as so-called "middleware" and successful practice of the invention is not dependent upon any particulars thereof. The implementation(s) of the data warehouse(s) is similarly not critical to the practice of the invention except that some type of content-addressability of memory 170a, 170b should be provided so that records may be accessed on the basis of any particular data contained therein in order to provide maximum flexibility of queries and, for example, optimal matching of portions of incoming jobs to portions of previously run or currently running jobs. If the data warehouse is divided or distributed, the portions thereof (which may not contain the same (e.g. duplicative) analysis processes and algorithms 180a, 180b), preferably implemented as modules, should be allowed to interact so that all or at least a maximum of possible queries which may be of arbitrary complexity in regard to performance of any and all resources in regard to particular applications and resources may be achieved. If division or distribution of the data warehouse is provided, it is considered to be preferable to do so based on how the grid is dispersed over multiple security domains.

Figure 1A:
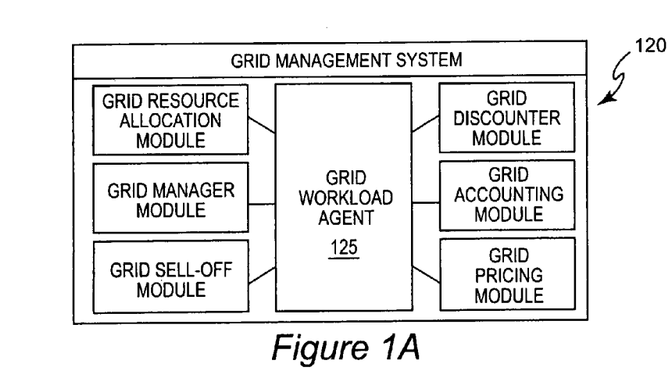
FIG. 1A illustrates interaction of a grid workload agent within the grid management system of FIG. 1 with a plurality of grid modules.

As also detailed in the above-incorporated application and as illustrated in FIG. 1A (corresponding to FIG. 5 therein), the grid management system 120 includes one or more workload agent(s) 125, preferably embodied as a module and which communicates with other modules to perform various desired functions such as allocation of resources, management of the grid and pricing, sales and accounting in regard to commercially available grid services. The general architecture of exemplary modules for performing preferred functions is schematically illustrated in FIG. 1A and portions thereof are discussed in detail in one or more of U.S. patent application Ser. No. 11/031,489, filed Jan. 6, 2005, Ser. No. 11/031,543, filed Jan. 6, 2005, Ser. No. 10/940,452, filed Sep. 14, 2004, Ser. No. 11/031,490, filed Jan. 6, 2005, and Ser. No. 10/870, 522, filed Jun. 17, 2004 which are also hereby fully incorporated by reference.

More generally, modules or sub-systems are architectural components in a grid management system to execute specific functionality in a grid environment such as workload management, software/hardware catalog management, accounting/billing, pricing calculation, discount management and the like. For example, a pricing calculation module determines the price for executing a job or job portion within the grid infrastructure or environment in a specific resource. Each module or sub-system executes a method or an algorithm to provide the intended functionality and may be regarded much in the nature of an "engine" for performing that function and is preferably embodied as a software "object" (in the object oriented programming sense) but may be a special purpose processor in hardware or a combination of hardware and software.

Figure 1B:
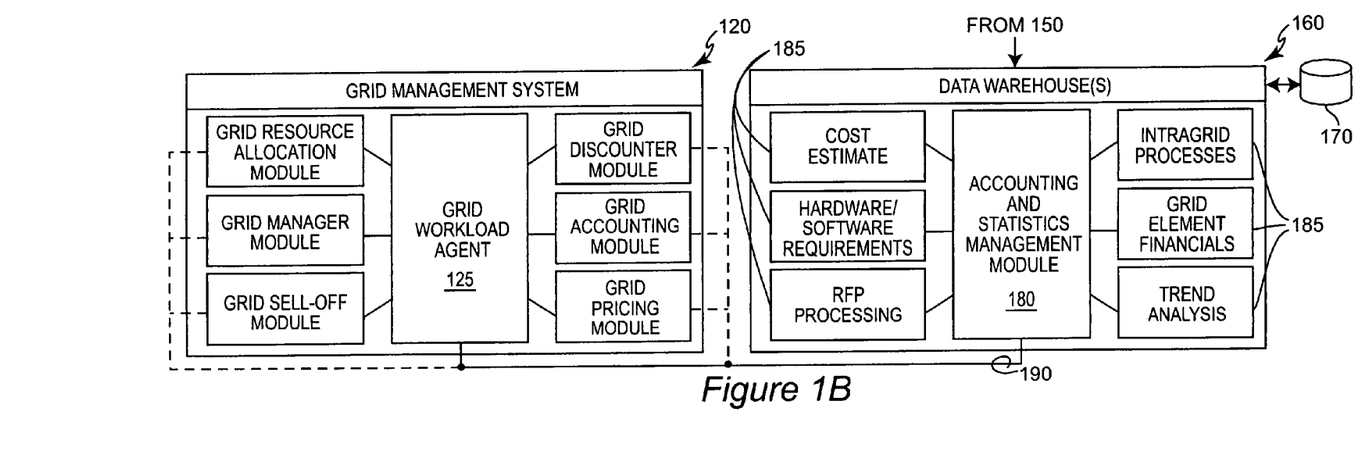
FIG. 1B illustrates interaction of an accounting and statistics management module in accordance with the invention with a plurality of accounting and statistics modules and the interaction through the workload agent and modules associated therewith of FIG. 1A.

As illustrated in FIG. 1B, the invention is also preferably embodied as a module or sub-system arranged to execute accounting, statistics and historical trending management in regard to performance of particular jobs or job portions by particular resources as distinct from resource allocation and accounting for usage of resources although the latter functions can be substantially refined by employment of the invention. More specifically, within a data warehouse 160, an accounting, statistics and historical trending management sub-system 180 is provided, preferably as a module as defined above. The accounting and statistics management module 180 manages the acquisition of performance data from the individual or groups of grid resources 150 for storage as discussed above and manages transfer of data from mass storage 170 to each of a plurality of grid processes and algorithms 185 in communication therewith. Further, accounting and statistics module 180 either alone or, preferably, in cooperation with the grid workload agent 125 manages communication of the results of processing by each of the modules 185 to the grid management system modules associated with the grid workload agent 125, discussed above, as schematically depicted at 190 of FIGS. 1 and 1B including dashed line portions. The routing of these communications is not at all critical to the practice of the invention but routing through the grid workload agent where the distribution of data is managed is preferred.

The particular processes and algorithms and details thereof performed by modules 185 associated with the accounting and statistics management module 180 are not at all critical to the practice of the invention but some will preferably be chosen to complement the modules associated with the grid workload agent 125 and provide a mechanism for transfer of processed data acquired at a fine-grained level of specific job portions and specific resources as distinguished from operating on data which may collectively reflect a group of jobs or job portions executed on a group of resources (or portions of a group of resources which may not be distinguishable from the group of resources in general) as disclosed in the above-incorporated applications. For example, performance data processed by cost estimate, hardware/software requirements and intra-grid process modules can provide analyses of fine-grained data which can certainly refine the performance of grid resource allocation, grid manager, grid pricing, job run time estimation and grid discounting modules in grid management system 120 and a trend analysis module may also enhance grid resource allocation and workload smoothing as discussed above by supplying fine-grained data in response to more closely defined queries more specifically matched to job portions while other modules such as RFP generation processing may be provided for a special purpose function and grid element financial analysis may be useful for capacity management and input therefore including determination or projection of effects of resource additions and/or upgrades.

Figure 2:
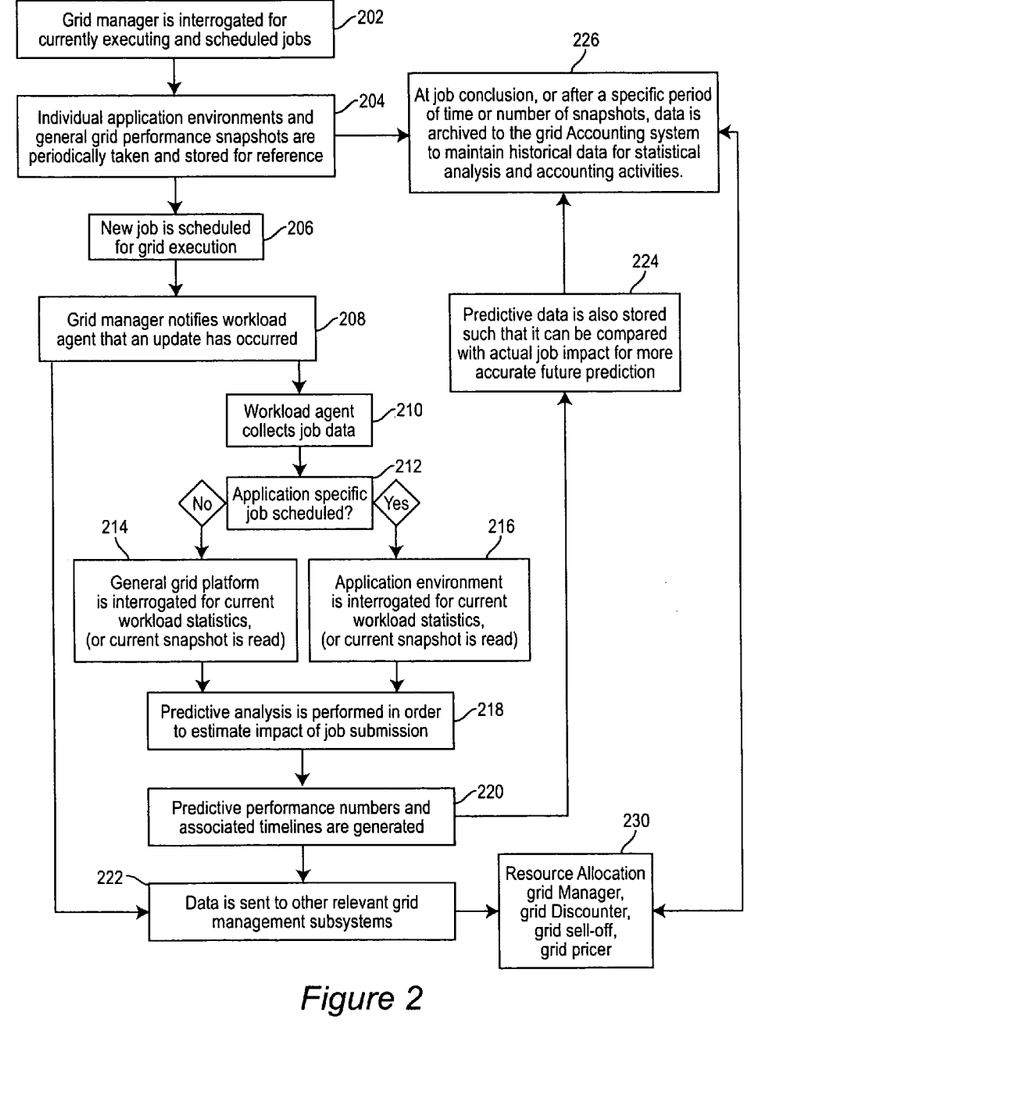
FIG. 2 is a diagram similar to a flow chart which illustrates operation of the invention including interactions with and of various modules providing analysis tools and the like, and FIG. 3 illustrates operation of an analysis of an exemplary portion of a job in accordance with the invention for differing depths of performance data.

Referring now to FIG. 2, the relationship of operations performed by the invention will be discussed. It should be understood that FIG. 2 is not intended to be a flow chart even though some aspects of a flow chart may be included. Several paths through the operations illustrated may be performed substantially in parallel and in a recursive manner to assure that performance data is collected, stored and retrieved to support at least the preferred high-level functionalities (corresponding to the modules illustrated in FIG. 1B) of:

1.) Refinement of inbound job cost development or estimation;

2.) Refinement of hardware and software platform requirement decisions for inbound grid jobs;

3.) Enhance performance and accuracy of grid RFP processing;

4.) Improve intra-grid processing through statistical learning;

5.) Provide a platform for financial analysis of grid elements: and

6.) Provide a platform for computing industry trend analysis.

The initial operation performed in the preferred mode of operation of the invention is for the grid management system 120 to interrogate the processors and applications of the grid (e.g. individual application environments together with their respective connected resources) 140 to determine currently executing and scheduled jobs as illustrated at 202. This step is important to assure that on-going management of the grid can be handled properly so that performance data will not be skewed by inefficient grid management and that the desired performance data which is continually becoming available from the grid will be recognized and collected. Once the currently executing and scheduled jobs and respective portions thereof are identified, performance "snapshots" of the current instantaneous operations of individual application environments 140 are periodically taken and stored, as illustrated at 204. This step interacts with step 226 to archive the snapshot data at the conclusion of the job or after a predetermined number of snapshots and interacts with step 222 to forward data on a real-time or periodic basis to other relevant management sub-systems on the same grid or one or more other grids.

However, since most of the exemplary high-level functions enumerated above are principally involved with the projection of the effects on the grid operations of an incoming job and/or the effect of the current grid state on how the job will be executed and the estimation of how long it will take, the performance data collection process in accordance with the invention continues with the input and scheduling of an incoming new grid computing job, as illustrated at 206, followed by the grid management system notifying workload agent(s) 125 that an update has occurred, as illustrated at 208. In response, the workload agent(s) and/or the accounting and statistics management module 180 collect job performance data which corresponds to characteristics or combinations of characteristics of respective portions of an incoming job, as illustrated at 210.

It is then determined if the new or incoming job or portions thereof are application specific, as illustrated at 212. If so, suitable application environments 140 for performing the job or respective portions thereof are interrogated or the current snapshot read for current workload statistics, as illustrated at 216. If not, essentially the same operation is performed generally over all application environments 140 constituting the grid environment. In either case, a predictive analysis 218 is performed to estimate the impact of the job submission on the grid and predictive performance numbers and associated timelines are generated and reported (220) by being sent (222) to other connected grid management sub-systems or modules and stored (224) so that the predictive data can be compared with actual job impact, once determined and quantified, in order to support refinement of job impact prediction or, conversely predicting the likelihood that a job run time can be performed within a given historical performance statistic, particularly in connection with grid architecture and other likely concurrent grid processing. Again, at the job completion or periodically, the resulting predictive data is archived at 226 while current actual performance data is being collected at 204 and archived as described above.

Step 222, described above provides the predictive data and data collected at 204 to relevant sub-systems on a substantially real-time basis, as illustrated at 230. These sub-systems can also access archived data resulting from 226. These sub-systems or modules perform respective types of analyses and control functions including but not limited to resource allocation, grid management, grid processing discount determination and sell-off of idle resource time and pricing analyses and determination. These functions may be made very flexible in regard to the particular analyses performed by the capability of the data warehouses 160 and the content addressable memories provided therein to respond to queries which may be very flexibly defined and arbitrarily complex to retrieve any performance data or parameter based on any other performance data or parameter or logical (e.g. Boolean) combination thereof, as alluded to above.

Figure 3:
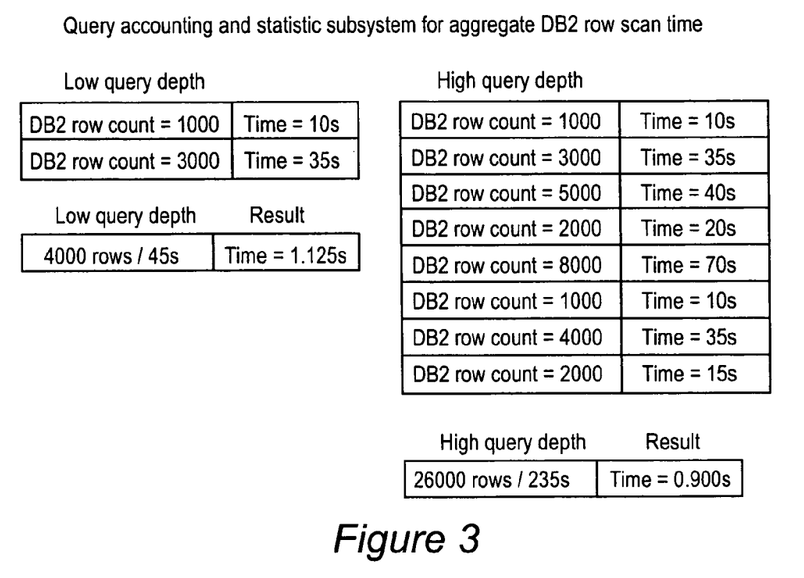

Referring now to FIG. 3, the improvement of performance prediction with increasing query depth is depicted. In this case, the time taken to count rows or lines of data is taken as an indicator of performance. For a low query depth of two samples of performance data from different jobs and possibly different application environments, a resulting prediction of 4000 rows being counted in 45 seconds or 1.125 milliseconds per row is made for a small extrapolation. However, with six historical performance statistics, an even greater extrapolation can be made with greater accuracy and confidence. If such an analysis includes, for example, a sort by particular platforms, the most efficient platforms for a given job of portion thereof can be readily determined. Likewise, even modest query depth can provide a basis for predicting a likelihood that a given job or job portion run time can be completed within a given historical performance statistic within the environment of either particular or historically likely concurrent grid processing and/or grid architecture. The ability to make flexible and arbitrarily complex queries as discussed above also allows any incoming job to be rapidly analyzed and estimations of performance of each portion (with arbitrarily fine granularity) can be matched to previously collected data from previous jobs, particularly for improving accuracy of job pricing, RFP creation, improvement of selection of most efficient available resources and estimation of the required amount of grid resources required for a requested job.

It can be appreciated that the inquiry depth will, potentially, increase very quickly for a particular performance criterion such as in the simple example of FIG. 3. For example, it should be noted that the first two entries of the high query depth column of FIG. 3 are the same as the only two entries in the low inquiry depth column. It should also be noted that both entries show performance which is significantly slower than the performance time estimated from high entry depth data as well as a trend toward longer times for larger numbers of row scans. Therefore, the performance estimate may be skewed somewhat by these data entries even at high query depth. Also, it is assumed for purposes of this example that the query was simply for all performance data involving aggregate DB2 row scan time.

However, the collection of performance data in association with additional criteria and characteristics of each job allows a highly specific and arbitrarily complex query to be performed and the characteristics and hardware/software requirements of arbitrarily small portions of an incoming job to be very closely matched with collected actual performance data and which might cause either or both of the first two entries to be discarded in a more complex and detailed query while still maintaining substantial query depth but accumulating data which would be found by a more detailed and complex query relatively more slowly. Nevertheless, an improved closeness of matching of characteristics of portions of incoming jobs with portions of previously executed jobs clearly yields increased accuracy of predictions of job performance and provides increased levels of confidence even when large extrapolations must be made while reduction of the amount of data considered in the prediction processing permits a reduced response time while allowing comparison of analyses in regard to processing using different resources which can thus be allocated more efficiently and priced to maintain profitability margins with improved confidence and accommodation of run time contingencies, as well.

In view of the foregoing, therefore, it is seen that the invention provides a comprehensive system and method for monitoring, archiving and publishing to related grid modules comprehensive statistics supporting grid management of improved efficiency. The invention also provides a tool for collecting and arbitrarily correlating job performance statistics corresponding to individual job portions as performed by respective nodes across a grid environment to more accurately and effectively support smoothing of demand for particular resources and efficient allocation thereof based on historical data particularly in regard to the impact of an inbound job on grid activity and performance, RFP and resource usage, financial analysis of grid elements, trend analysis and the like.

While the invention has been described in terms of a single preferred embodiment, those skilled in the art will recognize that the invention can be practiced with modification within the spirit and scope of the appended claims.

Having thus described our invention, what we claim as new and desired to secure by Letters Patent is as follows:

1. A method of managing a grid computing environment comprising a plurality of resources, said method including steps of:
    determining currently executing and scheduled job portions having particular characteristics for said plurality of resources;
    performing job portions of a data processing request using respective heterogeneous and distributed resources of said grid computing environment, said resources including a plurality of platforms having different implementations, semantic behaviors and application programming interfaces and which may exhibit different performance for a given portion of a given job;
    periodically capturing and storing as data records, in correspondence with a plurality of characteristics of a respective job portion, a snapshot of current instantaneous operations of individual application environments in said grid computing environment from said respective resources performing said job portions of said data processing request in content-addressable storage, said data records corresponding to performance of respective ones of said respective resources while processing respective ones of said job portions, said performance being monitored in correspondence with said characteristics of respective ones of said job portions wherein said plurality of characteristics include nature of processing being performed during said instantaneous operation, said platform on which said processing is performed, said resource or resources on which said processing is performed and concurrent processing in said grid environment, such that any performance data or other parameter of said data records for respective ones of said resources may be retrieved based on any other performance data or parameter of said data records or logical combination thereof with arbitrarily fine granularity to closely match characteristics of job portions of any other job to assess impact of said other job on said grid environment, determine allocation of said resources to said portions of said other job or predict performance of said other job as performed on available resources;
    storing actual performance and predicted performance of said other job as performed by ones of said resources allocated to said other job;
    selecting data records in accordance with one or more of said plurality of characteristics stored in said data records as selected data records;
    retrieving said selected data records; and
    processing data retrieved in said retrieving step to produce processed performance data as historical performance statistics corresponding to said characteristics of said job portions and said resources.

2. A method as recited in claim 1 including a further steps of managing job portion allocation based on said processed performance data.

3. A method as recited in claim 1 including a further step of estimating job run time on the grid based on historical performance analysis.

4. A method as recited in claim 1 including a further step of processing a request for proposal based on historical performance analysis.

5. A method as recited in claim 3 including a further step of determining a likelihood that a job run time can be performed within an associated historical performance statistic.

6. A method as recited in claim 1 wherein said step of periodically storing data records includes storing data records in a data repository.

7. A method as recited in claim 6 including the further step of dividing said data repository into a plurality of distributed data repositories.

8. A method as recited in claim 7 wherein said step of dividing said data repository is based on how said grid computing environment is dispersed over multiple security domains.

9. A method as recited in claim 1, wherein said step of performing portions of a data processing request include a step of determining if portions of said data processing request are application specific.

10. A method as recited in claim 9, including the further step of interrogating the grid or interrogating an application environment of the grid based on a result of said step of determining if portions of said data processing request are application specific.

11. A system for managing a grid computing environment comprising:
- a plurality of heterogenous and distributed data processing resources, wherein respective ones of said data processing resources include a plurality of platforms having different implementations, semantic behaviors and application programming interfaces and which may exhibit different performance for a given portion of a given job;
- a grid management system including a grid workload agent to monitor respective ones of said data processing resources of said grid computing environment processing job portions of data processing requests, wherein said job portions have particular characteristics;
- content-addressable storage means for periodically storing data records forming a snapshot of current instantaneous operations of individual application environments in said grid computing environment which include, in correspondence with a plurality of characteristics of a respective job portion, performance data from respective resources monitored by said grid workload agent, wherein said plurality of characteristics include nature of processing being performed, said platform on which said processing is performed during said instantaneous operation, said resource or resources on which said processing is performed and concurrent processing in said grid environment, said performance data including data identifying a corresponding monitored respective resource while that resource is processing a respective one of said job portions of data processing requests in correspondence with said characteristic of a respective one of said job portions such that any performance data or other parameter of said data records for respective ones of said resources may be retrieved based on any other performance data or parameter of said data records or logical combination thereof with arbitrarily fine granularity to closely match characteristics of job portions of any other job to assess impact of said other job on said grid environment, determine allocation of said data processing resources to said portions of said other job or predict performance of said other job as performed on available ones of said data processing resources;
- a memory for storing actual performance and predicted performance of said other job as performed by ones of said data processing resources allocated to said other job:
- a content-addressable memory for retrieving said actual performance data on the basis of a said characteristic or combination of said characteristics, and processing data stored by said content-addressable memory to form processed performance data; and
- at least one module cooperating with said grid workload agent to manage said grid computing environment based on said processed performance data.

12. A system as recited in claim 11, wherein said means for managing said grid computing environment includes a plurality of modules for performing respective grid environment management functions including at least one of cost estimation, determination of hardware/software requirements, RFP processing, determination of intragrid processes, analysis of grid element financial data and historical trend analysis.

13. A system as recited in claim 11, wherein said means for managing said grid computing environment includes a module for performing a grid environment management function.

14. A system as recited in claim 11 wherein said means for retrieving and processing data includes an accounting and statistics management module.

15. A system as recited in claim 14 further including a grid workload agent wherein said accounting and statistics management module provides said processed performance data to said grid workload agent.

16. A system as recited in claim 15 further including functional modules associated with said grid workload agent to perform functions associated with said grid workload agent and wherein said accounting and statistics management module provides said processed performance data to said functional modules.

* * * * *